United States Patent [19]

Shapona

[11] Patent Number: 5,411,612
[45] Date of Patent: May 2, 1995

[54] METHOD OF SCALELESS INDUCTION HEATING

[75] Inventor: Mark G. Shapona, Canton, Mich.

[73] Assignee: Ford Motor Company, Dearborn, Mich.

[21] Appl. No.: 172,780

[22] Filed: Dec. 27, 1993

[51] Int. Cl.⁶ .......................... C21D 1/42; C21D 9/32
[52] U.S. Cl. .................................... 148/567; 148/572; 148/573; 148/575
[58] Field of Search .......................... 148/526, 567–575

[56] References Cited

U.S. PATENT DOCUMENTS

| | | | |
|---|---|---|---|
| 2,679,466 | 5/1954 | Spendelow, Jr. et al. | 148/629 |
| 2,799,604 | 7/1957 | Ness | 432/10 |
| 2,958,524 | 11/1960 | Delapena et al. | 266/125 |
| 3,587,149 | 6/1971 | Schumann | 29/81.06 |
| 4,016,015 | 4/1977 | Respen et al. | 148/320 |
| 4,366,008 | 12/1977 | Takeuchi et al. | 148/219 |
| 4,438,310 | 3/1984 | Cachat | 148/526 |
| 4,628,167 | 12/1986 | West | 219/644 |
| 4,871,403 | 10/1989 | Ludkovsky | 148/567 |

FOREIGN PATENT DOCUMENTS 1748899  7/1992  U.S.S.R. ............................... 148/567

Primary Examiner—George Wyszomierski
Attorney, Agent, or Firm—Joseph W. Malleck; Roger L. May

[57] ABSTRACT

A method and apparatus for carrying out scaleless inductive heating of ferrous parts comprising (i) using an integrated manifold-inductor quenchant device, and while gradually flowing a diluted combustible gas into the spacing between the inductor and part surface to be heated, inductively heating such surface as part of a heat treating cycle; and (ii) concurrently stopping such flow and injecting a fluid quenchant through the spacing to rapidly lower the temperature of the part surface to complete the heat treating cycle. Advantageously such method may further comprise flushing the spacing between the inductor and heated part surface, and then repeating the steps of the prior method to treat more parts with the same inductor.

6 Claims, 4 Drawing Sheets

METHOD OF SCALELESS INDUCTION HEATING

BACKGROUND OF THE INVENTION

1. Technical Field

This invention relates to the technology of induction heating of ferrous metals, and more particularly to techniques for preventing scale on such inductively heated metals.

2. Discussion of the Prior Art

All induction heating of ferrous pieces, as practiced today, cause at least some scale to form on the heated surface of the part undergoing treatment. The surface of the part, at the temperature of inductive heating, is very reactive with oxygen contained in ambient air or quench water. The resulting oxide scale is undesirable because (i) it prevents the pieces from being finish machined prior to inductive heating, (ii) the scale must be subsequently removed such as by shot or grit blasting (for parts of a compact shape) for an extended period of time such as from 15 seconds to 2 minutes, or alternatively by machining the part (if not of a compact shape) to remove the scale while achieving a precise net shape. The use of shot or grit blasting is undesirable because it is not only expensive, time consuming and imprecise, but it is limited to surfaces that are not critical (those that can be changed metallurgically or dimensionally by the blasting).

Sometimes scale formation has been slightly retarded by use of an inert gas blown into the gap between the inductor and part to bathe the heated part. (See U.S. Pat. Nos. 2,679,466 and 2,799,604). Unfortunately, use of an inert gas fails to significantly prevent formation of scale since some oxygen always remains to combine with the iron at the elevated temperatures; the inert gas does not combine with the oxygen.

Some attempt has been made to enclose the entire inductor and part within a chamber to carry out the heating; in this arrangement an inert gas atmosphere is maintained in the chamber during heating to exclude the presence of oxygen at the heated part surface. Such apparatus reduces the productivity rate because of the need to open and close the chamber, fill and refill inert gas into the chamber as a result of the need for water quenching. But more importantly, closed chamber inductive heating delays hardening and increases the cost of facilitizing a plant to carry out such process, the cost being increased because of the need for more inductors to accomplish the same throughput. Such great increase in capital cost may be as much as five-fold.

SUMMARY OF THE INVENTION

It is an object of this invention to provide a method of inductively heating (as well as an apparatus for carrying out such method), that prevents formation of scale when inductively heating without inhibiting instantaneous quenching when desired at the precise moment of the heating cycle.

The invention, in a first aspect, is a method of carrying out scaleless inductive heating of ferrous parts comprising (i) while gradually flowing a diluted combustible gas into the spacing between the inductor and part surface to be heated, inductively heating such surface as part of a heat treating cycle; and (ii) concurrently stopping such flow and injecting a fluid quenchant through the spacing to rapidly lower the temperature of the part surface to complete the heat treating cycle. Advantageously such method may further comprise flushing the spacing between the inductor and heated part surface, and then repeating the steps of the prior method to treat more parts with the same inductor.

The invention in a second aspect is an integrated inductor and quench apparatus for heat treating a ferrous part, comprising: (i) an integrated foraminous manifold and inductor cooperating with the part to be heated to provide a path for fluids to exit from the foramina of the manifold to traverse the heated surface of the part, the inductor being supported by or inherent in the manifold and is close proximity to the heated surface of the part with the fluid path disposed therebetween; (ii) is selectively controllable electric power supply for the inductor; and (iii) fluid supply means for introducing diluted and rapidly reactive combustible gas mixture at least during the power-on condition of the inductor, and for injecting a quenching fluid during the power-off condition of the inductor, the injection being through the manifold foramina to follow the path.

DETAILED DESCRIPTION AND BEST MODE

It is common practice to harden compact ferrous based parts such as ring gears, annular races, or circular hubs by using a circular inductor having an inside diameter which is slightly larger than the diameter of the outer surface of the part to be heat treated. This requires provision of an accurate and uniform magnetic coupling between the ferrous based part and the inductor itself. A quenching fluid is forced inside the inductor or through openings in the inductor to quench and thereby harden the heated surfaces at a proper timed sequence. Positioning of the inductor is critical in that a uniform small gap must be maintained between the inductor and the treatable surface to assure uniform induction heating across the entire part surface. Often times it is believed that induction hardening is applicable only to a limited range of steel materials and not suitable for hardening materials having complicated shapes because of the need for this critical spacing between the inductor and part.

During a typical induction hardening operation, the ferrous part is exposed to an alternating electric field which causes the surface of the part to heat. The inductor is designed to carry the magnetic field to the area of the part which is to be heated. To facilitate quenching, which actually creates the hardening, the inductor is in some cases a manifold with many holes on the surface facing the heated part. When the power is turned off, water or other quenching is forced through the holes onto the heated surfaces, cooling the part rapidly and hardening it. During heating, the hot surfaces of the part oxidize because of contact with oxygen in the surrounding atmosphere or air. Such integrated inductor-manifold is not only desirable to more fully bathe the part in a selected fluid, but the inductor can be moved to traverse the part if needed.

Figure 1:
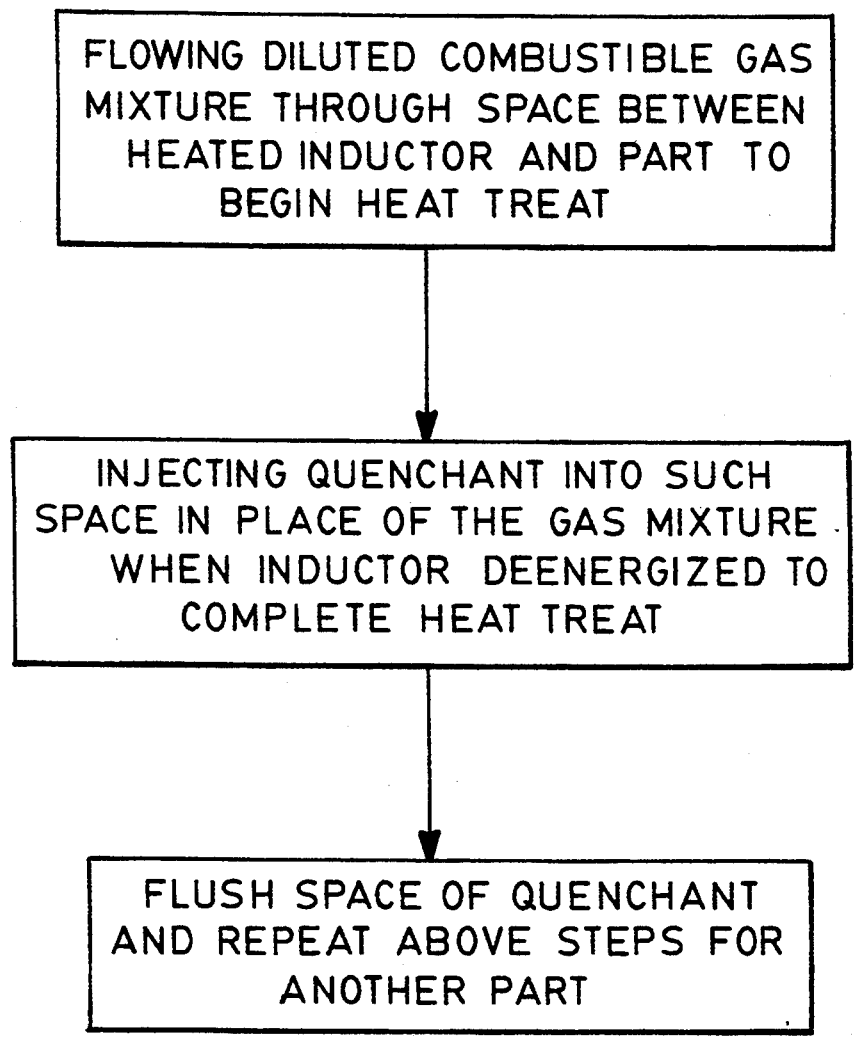
FIG. 1 is a schematic flow diagram of the method of this invention.

To prevent scale formation, this invention gradually flows a diluted combustible gas mixture across the surface that is heated so that oxygen in contact with the heated surface will react with the combustible mixture to burn and form water vapor and/or $CO_2$ before such oxygen can react with the heated ferrous material. Accordingly, (as shown in FIG. 1) the method of this invention for carrying out scaleless inductive heating of ferrous parts comprises: (a) while gradually flowing a diluted combustible gas mixture into a spacing between the inductor and the part surface to be heated, inductively heating such surface to a desirable temperature for a predetermined heat treat cycle; and (b) concurrent with stopping the flow, injecting a fluid quenchant through the spacing to rapidly lower the temperature of the heated surface to complete the heat treat cycle. For productivity purposes, the process may further include the additional step of flushing the spacing of any quenchant and then repeating the initial steps to treat more parts with the same inductor and gas mixture.

Ambient air, containing oxygen, present in such spacing, would normally react preferentially with the ferrous metal. With this invention, however, the gaseous reactant that is flowing slowly across the heated surface will react with the available oxygen before it can react with the iron. The gaseous reactant is desirably a combustible mixture containing essentially 2–15% by weight hydrogen and the remainder nitrogen or in some cases argon or other neutral. Natural gas or propane may also be used for the combustible portion of the mixture and if so then the dilution ratio would require about 4–20% $CH_4$ or propane.

The quenchant is an economical medium that can quickly absorb heat from the part surface and transfer it thereaway; it also is capable of controlling the heat removal rate and can have constituents that rustproof the part. Preferably, the quenchant is selected from the group consisting of water, synthetic quenchants (i.e., Vcon or Aquaquench) and oil.

Figure 2:
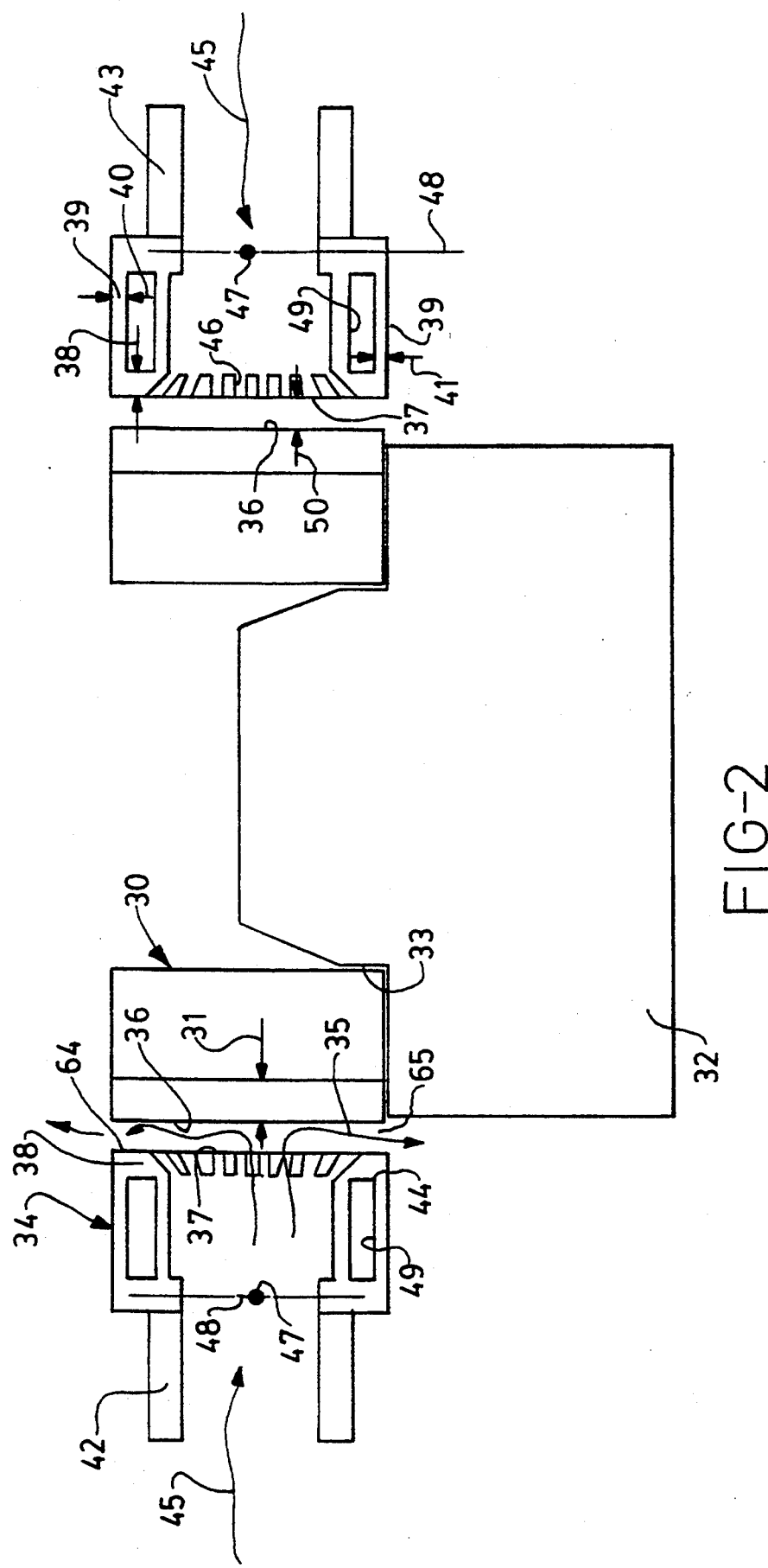
FIG. 2 is an elevational sectional view of one embodiment of an inductor for this invention, located in position for inductively heating an iron-based ring gear.
Figure 3:
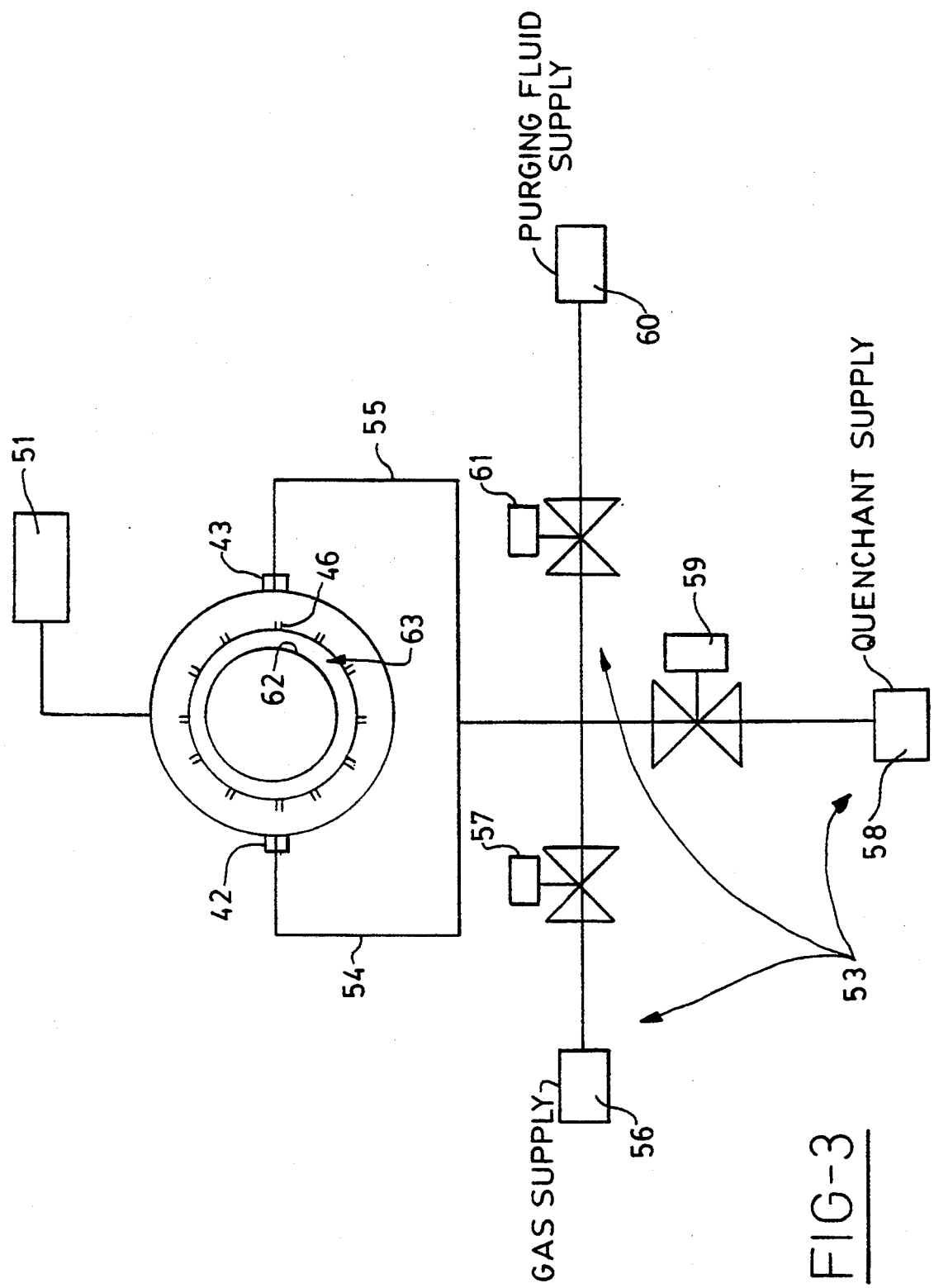
FIG. 3 is a schematic layout of the apparatus of this invention for carrying out scaleless inductive heating for a heat treat cycle.

The apparatus for carrying out such process is shown in FIGS. 2 and 3. The apparatus comprises an integrated manifold, inductor and quench device for heat treating a ferrous body. The apparatus comprises a foraminous manifold cooperating with the part to be heated to provide a path for fluids to exit from the manifold foramina and traverse the heated surface of the part. The inductive heater is integrated to the manifold so as to be carried in close proximity to the heated surface of the part with the fluid path disposed therebetween. As shown in FIG. 2, a part 30 to be heat treated, may be a cylindrical race requiring hardening to a radial depth 31 of about 2–3 mm. The race is positioned on a metal tooling post 32 (resistant to high temperatures) having a shallow step 33 to concentrically center the race. An integrated single coil inductor-manifold device 34 cooperates with the part 30 to provide a path 35 for fluids to exit from the device 34 and traverse the heated surface 36 of the part 30. The device 34 has a hollow inductor ring 44 constituted of a copper alloy, typically 99.9% copper. To function as an inductor, the device 34 has an inner face wall 37 with a thickness 38 of about 0.100 inches, and side walls 39 having respective thicknesses 40 and 41 of about 0.100 and 0.060 inches. To function as a manifold, fluid feeding ducts 42,43 are attached to at least opposite sides of the ring 44 to quickly introduce fluids 45 to the interior of the manifold. Foramina or openings 46 are drilled through the face wall 37, each radiating from a point 47 lining along the outside diameter 48 of the manifold. The inductor-manifold device may contain closed cooling channels 49 to control overheating.

The inductor portion of the device is not only carried by the manifold portion but becomes an integral part of the walls of the manifold portion. The face 37 of the inductor must be in close proximity to the surface of the part to be treated to provide a spacing or gap 50 therebetween (usually 0.060–0.075 inches and up to 0.1 inch for simple cylindrical rings, and up to 0.25 inches for elongated objects such as axles or camshafts); the fluid path 35 must be disposed between the inductor and part.

As shown in FIG. 3, the power supply 51 for the inductor-heater is preferably supplied with a high radio frequency voltage of about 20,000 volts (100,000 watts) at 300,000 cycles per second. The radio frequency power supply is desirable because it facilitates hardening control of thin cases and makes possible hardening of very small section parts such as in some gears, but is useful primarily with simple geometrical shapes or surfaces because the inductor throw must be accurately concentrated. For part surfaces that are more complex, such as undulating large section teeth of gears or elongated axles, the power supply is desirably of a low frequency, solid state type with a voltage of about 800 and a current of about 1,000 amps; the throw distance is greater but pattern is not well defined because of the low frequency.

A fluid supply 53 is provided for introducing the diluted but rapidly reacting combustible gas mixture at least during the power-on condition of the inductor and for injecting a quenchant fluid during the power-off condition. As shown in FIG. 3, three fluid supplies controllably and independently feed a fluid into the split delivery lines 54,55 connecting with ducts 42,43. A dilute combustible gas supply 56 has its own solenoid valve 57 to permit passage of the gas; a quenchant supply 58 such as water at a pressure of about 7–40 psi, has its own solenoid operated valve 59 to control quenchant passage; and a purging fluid supply 60, such as air at a pressure of about 80 psi, has its own solenoid valve 61 to permit air passage.

To prevent oxidation of the heated part surface when the inductor is in the power-on condition, valve 57 is opened (while the other valves 61 and 58 are closed) to allow a slow flow of combustible gas mixture through the manifold portion, through the foramina openings 46, to contact the surface 62 at a perpendicular angle and thereby spread out to exit from the gap 63 at opposite edges thereof (such as at 64,65 in FIG. 2). The flow is preferably about 100–200 cubic feet per hour at or slightly above atmospheric pressure. The flow is extremely slow allowing the combustible portion of the gas to ignite and form a very small flame along the heated surface during the heating stage of the cycle.

When heating is properly attained, the power is turned off and liquid quenchant is injected into the manifold, through foramina 46, to spread out through the gap 63 and exit at the edge location 64,65. This is accomplished by closing valve 57 and opening valve 59 for a period of about 5–30 seconds. Following rapid cooling to complete the heat treating cycle, purging fluid from supply 60 is injected for a period of about 2–4 seconds to flush out any remaining quenchant particles from the common supply lines, ducts, manifold and gap.

This is accomplished by closing valve 59 and opening valve 61.

Figure 4:
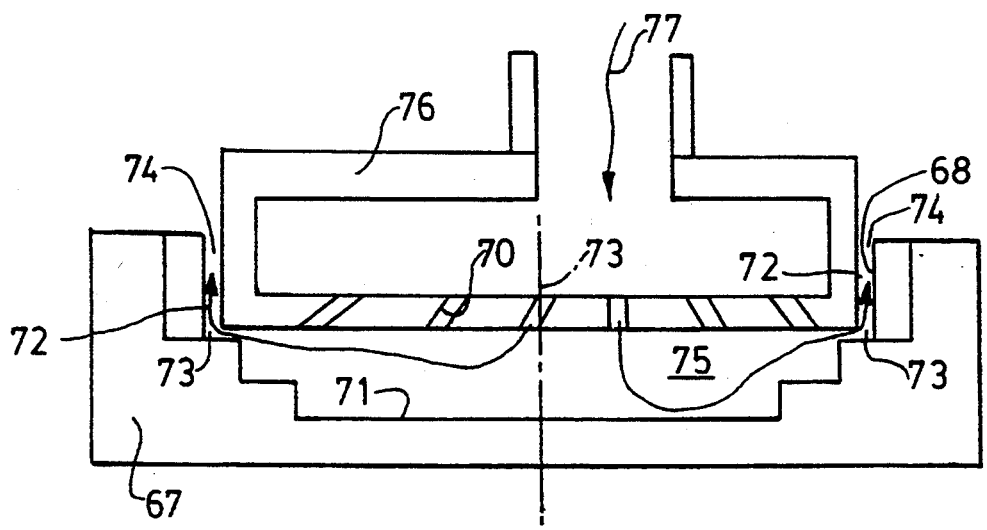
FIG. 4 is an alternative embodiment for the inductor positioned to function with a hub part having internal gear teeth.

Although, in FIG. 2, the flow path 35 for the fluids is initially radial with reference to the annular part surface to be heat treated, thereby ensuring total coverage of the fluids along the heated surface, some parts may dictate a slightly revised flow path. As shown in FIG. 4, the part 67 may be a drum with an internal annular surface 68 to be heat treated. The inductor-manifold device 69 may be configured to fit down into the hollow part 75 of the drum and have foramina or openings 70 directed to impinge the fluids 77 on the interior non-heated side wall 71 of the drum and thence flow into gap 72 by entering at one edge 73, traversing along the surface 68 (parallel to the ring axis 73) and exiting from the gap at edge 74. The foramina can be about 0.25 inches in this manifold-inductor design. The heat treat cycle would, of course, introduce the diluted combustible gas mixture, quenchant and purging gas (if used), in sequence through the inductor-manifold 76 as previously described. In still other applications the reactant delivery manifold may be separate from the inductor or quench manifolds; however, the flow path for the reactant and the quenchant must be into the spacing or gap between the inductor and heated part surface.

I claim:

1. A method of carrying out scaleless inductive heating of ferrous parts by use of an inductor having internal passages therethrough, comprising:
   (a) while gradually flowing a gaseous reactant along a flow path through said inductor passages into a spacing between said inductor and a part surface to be heat treated, inductively heating such surface to a temperature for carrying out a heat treating cycle, said reactant being capable of reacting with any available oxygen in said space before such oxygen can react with part surface; and
   (b) concurrently stopping said flow and injecting a fluid quenchant along the same flow path through said spacing to rapidly lower the temperature of said part surface to complete the heat treating cycle.

2. The method as in claim 1, in which said process further comprises steps: (c) flushing the spacing of any quenchant, and (d) repeating the steps (a) and (b) to treat more parts with the same inductor.

3. The method as in claim 1, in which said heat treating cycle is inductive hardening and said gradual flow of the gaseous reactant along said path is in the range of 100–200 cubic feet per hour at or slightly above atmospheric pressure.

4. The method as in claim 1, in which said gaseous reactant consists essentially of 2–15% hydrogen and the remainder nitrogen or an inert gas.

5. A method of carrying out scaleless inductive heating of ferrous parts, comprising:
   (a) while gradually flowing a gaseous reactant, of a diluted combustible mixture consisting essentially of 2–15% compressed natural gas ($CH_4$) and the remainder nitrogen or inert gas, into the available spacing between an inductor and a part surface to be heat treated, inductively heating such surface to a temperature for carrying out a heat treating cycle, said reactant being capable of reacting with any available oxygen in said space before such oxygen can react with the part surface.

6. A method of carrying out scaleless inductive heating of ferrous parts, comprising:
   (a) while gradually flowing a gaseous reactant of a diluted combustible gas mixture consisting essentially of 1–10% propane and the remainder essentially nitrogen or an inert gas, into the available spacing between an inductor and a part surface to be heat treated, inductively heating such surface to a temperature for carrying out a heat treating cycle, said reactant being capable of reacting with any available oxygen in said space before such oxygen can react with the part surface.

* * * * *